Oct. 31, 1950  W. W. YEANDLE  2,528,407
METHOD OF GRANULATING AMMONIUM NITRATE AND OTHER
SALTS AND APPARATUS THEREFOR
Filed Sept. 19, 1947  3 Sheets-Sheet 1

Inventor:
William W. Yeandle,
By Clinton, Schroeder, Merriam, & Hofgren, Attys.

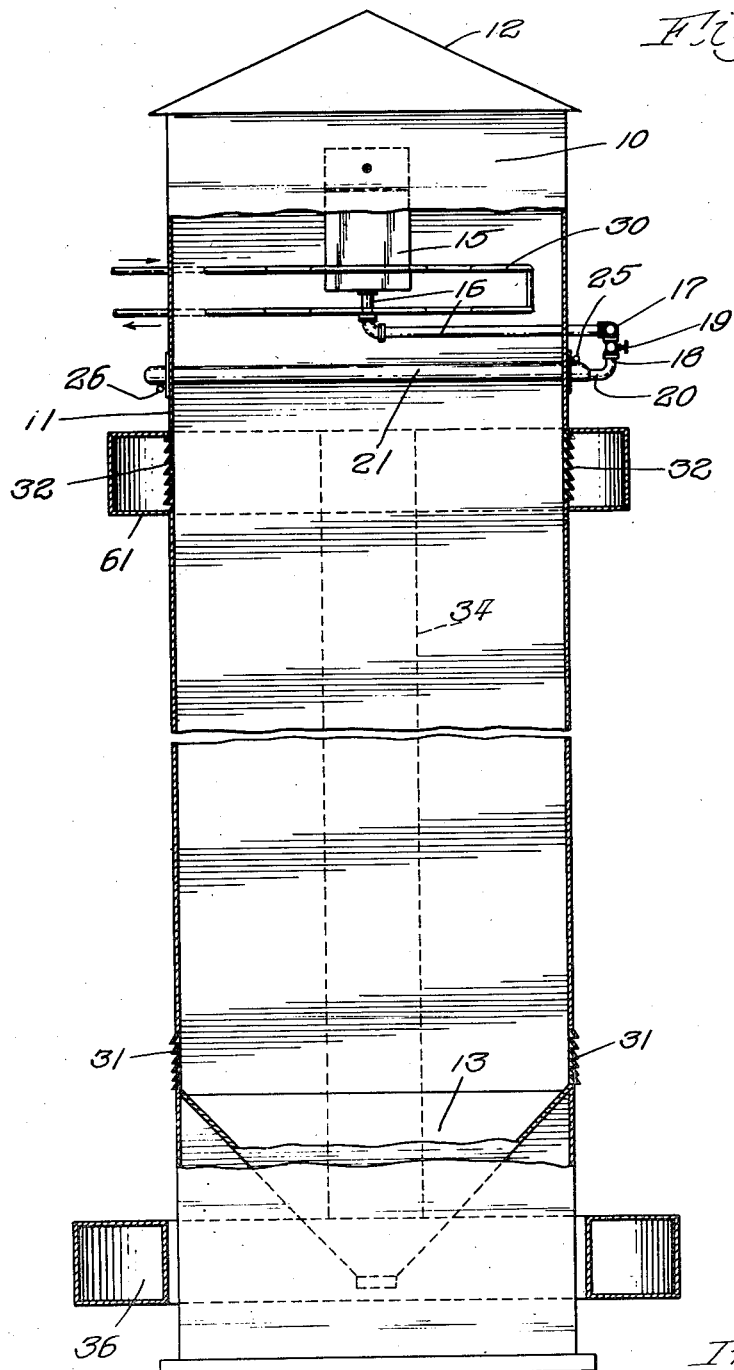

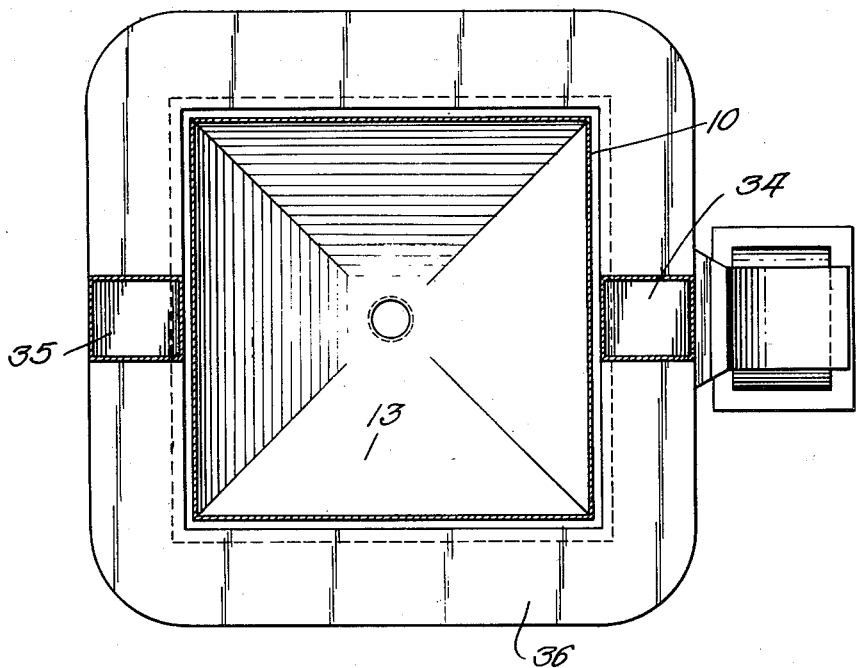
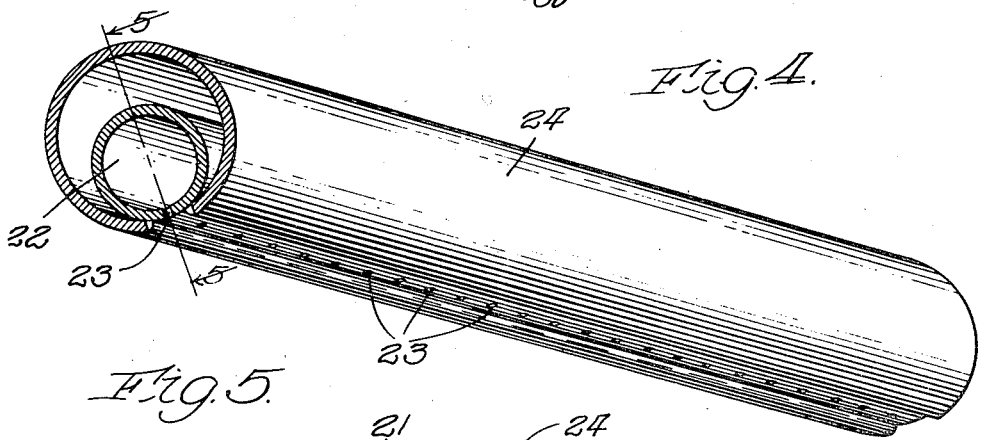
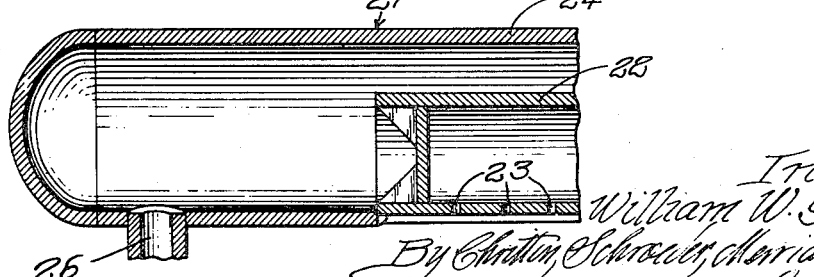

Patented Oct. 31, 1950

2,528,407

UNITED STATES PATENT OFFICE 2,528,407

METHOD OF GRANULATING AMMONIUM NITRATE AND OTHER SALTS AND APPARATUS THEREFOR

William W. Yeandle, Pittsburg, Kans., assignor to Spencer Chemical Company, a corporation of Missouri Application September 19, 1947, Serial No. 775,090

9 Claims. (Cl. 23—302)

This invention relates to the granulation of ammonium nitrate and other like materials and relates particularly to the granulation of such materials by a prilling process.

The prilling of ammonium nitrate in a spray tower is well known. The ammonium nitrate is introduced in a very concentrated heated solution to the top of a tower and is sprayed in small droplets into the tower and permitted to fall downwardly against an upwardly directed current of relatively cold air. During this fall the liquid material solidifies, and in a properly designed tower, reaches the bottom in the form of granules or prills.

Various difficulties have been encountered in the operation of such prilling towers. The dispersion orifices tend to freeze up and clog. Stalagmites and stalactites tend to form on the solution manifolds. Salt may be deposited on the side of the tower and so fall intermittently into the granulated portion. Most serious is the difficulty in cooling the characteristics, particularly as to size of the granulated product.

I have now discovered that these difficulties may be reduced or eliminated and a superior control established providing the dispersed particles are caused to fall during at least a small portion of their drop through a relatively quiescent area of heated air. This heated zone is preferably considerably warmer than the cooling zone beneath it and is preferably at or slightly above the dispersion temperature of the liquid.

The establishment of such a zone of heated air below the orifices automatically prevents freezing of the orifices or the formation of solid deposits in the vicinity thereof. It also permits the particles to form more perfect spheres before they reach the freezing atmosphere and this produces granules not only of more uniform shape but more uniform in size. The resulting product, therefore, has considerably less tendency to cake, it being well known that hydroscopic materials show less tendency to cake or lump if the granules are of uniform shape and size.

For example, in using ammonium nitrate, very uniform spherical pellets or prills fall almost entirely within the range of 10-40 mesh size. This size, however, may be controlled further by the selection of the concentration, the temperature, the size of the orifice and the size of the zone of warm air.

The invention is described in the drawings in which:

Fig. 2 is a section at right angles indicated by the lines 2—2 of Fig. 1;

Fig. 3 is a section taken along the line 3—3 of Fig. 1;

Fig. 4 is a perspective view enlarged of the prilling line, and

Fig. 5 is a cross section taken along the line 5—5 of Fig. 4.

Figure 1:
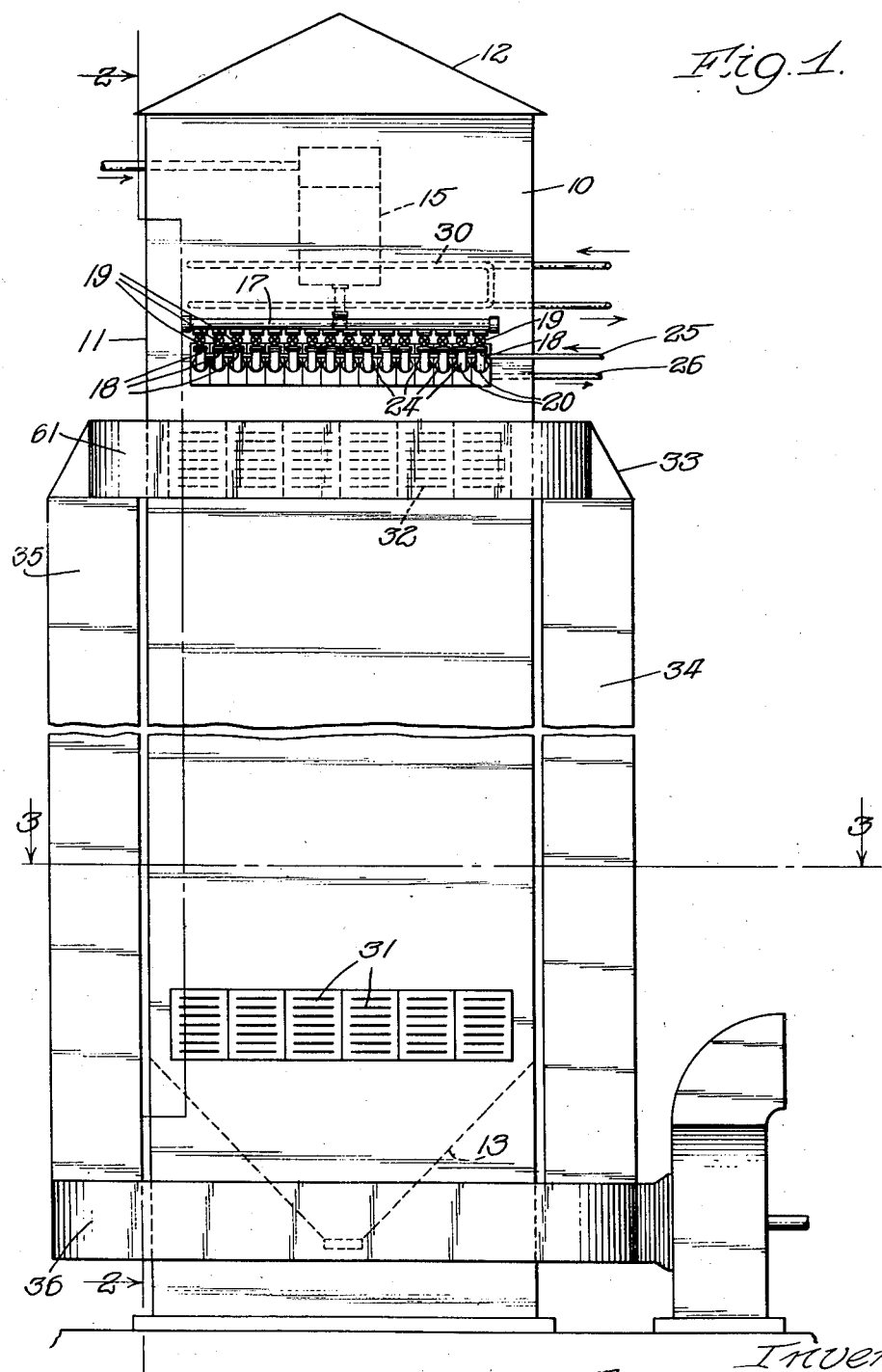
Fig. 1 is a side elevation of a tower.

As shown in the drawing, 10 indicates a tower having side walls 11, a roof 12 and a bottom 13 of inverted cone shape.

Ammonium nitrate is supplied from a constant head tank 15 within the upper portion of the tower. The solution is fed from this tower through the line 16 to the header 17, outside of the tower from which the lines 18 controlled by the valves 19 leads to a plurality of distributing headers 20. Each header 20 communicates with a prilling line 21 shown in detail in Figs. 4 and 5. The prilling line comprises an inner pipe 22 having a plurality of spaced openings 23 in the bottom thereof for extrusion of ammonium nitrate. This pipe is surrounded by a large pipe 24 within which the pipe 22 is eccentrically mounted. Steam is introduced to the pipe 24 through the line 25 and is drawn through the line 26. Suitable steam traps are provided but not shown.

Immediately above the prilling lines is a suitable heating means such as the steam coil 30. This coil may be immediately above, immediately below or at the level of the prilling lines. It is preferred to mount the above so that it will not become contaminated with material, but it is possible to so place it below the point of extrusion as to avoid such contamination.

Cold air is admitted to the tower by any suitable means such as the louvers 31 and is drawn upwardly through the tower to a point somewhat below the prilling lines. At this point it is withdrawn as, for example, through the louvers 32 through the manifold 33 and then downwardly through the lines 34 and 35 to a manifold 36. The necessary draft may be produced by a suitable device (not shown) connected with the manifold 36.

Preheated air may be supplied to the top of the tower if desired, but it has been found in practice that the leakage in a tower of ordinary construction is sufficient to supply whatever draft, if any, is required for the heated air.

In a tower for ammonium nitrate in which a 95% by weight concentration solution is heated to a temperature of 140° C. orifices of the size of 0.025 inch are preferred. Smaller sizes may be used if proper precautions are taken to prevent clogging by dirt, as for example, by a suitable screen. Sizes much larger than 0.025 inch produce a non-uniform product in the case of ammonium nitrate.

It is preferred to employ screw-in or tapered type pins drilled to the predetermined opening before insertion in the prilling line.

Employing ammonium nitrate with this type of solution and in this size of opening, a suitable distance between the bottom of the prilling opening and the top of the louvers 32 is two feet, four inches, when introducing 336 pounds of ammonium nitrate solution per minute against an up-draft of 75–150,000 cu. ft. of air per minute at approximately an inlet temperature of 70° F.

The foregoing detailed description has been given for clearness of understanding only, and no unnecessary limitations should be understood therefrom.

I claim:

1. In the production of granules from a molten liquid, the steps of dropping the molten material in droplet form through a heating zone free from cooling gas, and then dropping the droplets through cooling gas in a cooling zone, beneath the heating zone, counter current to an upwardly directed draft of cool gas, which gas is withdrawn laterally before any substantial portion thereof reaches the heating zone.

2. The method as set forth in claim 1 in which the molten material is a concentrated aqueous solution of ammonium nitrate.

3. The method as set forth in claim 1 in which the molten material is a concentrated aqueous solution of ammonium nitrate and the cool gas is air.

4. The method as set forth in claim 1 in which a zone of gas immediately above the point of introduction of the molten material is positively heated.

5. The method of forming ammonium nitrate in substantially spherical granules within a predetermined range of size, which comprises heating a concentrated, aqueous solution of ammonium nitrate of approximately 95% by weight strength to a temperature of approximately 140° C., ejecting the molten ammonium nitrate through a plurality of small openings to form droplets, dropping the droplets through a heated zone immediately beneath said openings, the gas in said zone being heated by means consisting of heating elements maintained adjacent said openings, and said gas being substantially free of cooling gas from a cooling zone below said heating zone, thereafter dropping the droplets through an upwardly directed draft of relatively cool air in said cooling zone wherein the ammonium nitrate is frozen, and then cooling the ammonium nitrate in frozen form.

6. The method as set forth in claim 5 in which the ejected ammonium nitrate is dropped through a zone of warm gas of sufficient depth to permit formation of substantial spherical granules before reaching the upwardly directed draft of cool gas.

7. The method as set forth in claim 5 in which the size of the openings is approximately 0.025 inch.

8. The method as set forth in claim 5 in which the temperature in said heating zone is maintained at approximately 140° C.

9. A prilling tower comprising side walls of substantial height, a collecting device near the bottom of the tower, injection means near the top of the tower, heating means adjacent and immediately beneath the injection means consisting of stationary heating elements, a cooling zone beneath the heating elements in which means are provided for directing an upward draft of cool gas through an intermediate portion of the tower, means below the heating elements for withdrawing the upwardly directed cooling gas through the walls of the tower whereby a heating zone is provided below said injection means substantially free of cooling air.

WILLIAM W. YEANDLE.

REFERENCES CITED

The following references are of record in the file of this patent:

UNITED STATES PATENTS

| Number | Name | Date |
|---|---|---|
| 2,109,811 | Welter | Mar. 1, 1938 |
| 2,382,298 | Datin | Aug. 14, 1945 |
| 2,402,192 | Williams et al. | June 18, 1946 |